United States Patent

Bernauer et al.

[11] Patent Number: 6,163,125
[45] Date of Patent: Dec. 19, 2000

[54] DRIVE DEVICE FOR A MOVABLE PART THAT CAN BE DISPLACED BETWEEN END POSITIONS IN A VEHICLE AND METHOD FOR THE PRODUCTION THEREOF

[75] Inventors: Christof Bernauer, Forbach; Peter Braun, Buehlertal; Rolf Baumann, Buehl, all of Germany

[73] Assignee: Robert Bosch GmbH, Stuttgart, Germany

[21] Appl. No.: 09/341,761

[22] PCT Filed: Oct. 30, 1998

[86] PCT No.: PCT/DE98/03175

§ 371 Date: Jul. 16, 1999

§ 102(e) Date: Jul. 16, 1999

[87] PCT Pub. No.: WO99/29528

PCT Pub. Date: Jun. 17, 1999

[30] Foreign Application Priority Data

Dec. 10, 1997 [DE] Germany .................. 197 54 843

[51] Int. Cl.⁷ ................. B60J 7/057; G01D 5/14
[52] U.S. Cl. ............ 318/626; 318/653; 324/207.2; 324/207.25
[58] Field of Search ............. 318/626, 647, 318/652, 653; 324/207.11, 207.13, 207.2, 207.25, 219; 310/66, 67 R, 68 R, 69

[56] References Cited

U.S. PATENT DOCUMENTS

| | | | |
|---|---|---|---|
| 4,468,063 | 8/1984 | Yukimoto et al. | 296/223 |
| 4,866,357 | 9/1989 | Miller et al. | 318/443 |
| 5,528,139 | 6/1996 | Oudet et al. | 324/207.2 |
| 5,705,755 | 1/1998 | Yamamura | 73/862.191 |
| 5,791,204 | 8/1998 | Torii et al. | 74/606 R |
| 5,875,588 | 3/1999 | Torii et al. | 49/349 |
| 5,924,324 | 7/1999 | Kilker et al. | 74/89.18 |
| 6,051,899 | 4/2000 | Walther et al. | 310/71 |

FOREIGN PATENT DOCUMENTS

| | | |
|---|---|---|
| 0 469 286 | 2/1992 | European Pat. Off. . |
| 0 692 400 | 1/1996 | European Pat. Off. . |
| WO 97/43602 | 11/1997 | WIPO . |

*Primary Examiner*—Bentsu Ro
*Attorney, Agent, or Firm*—Ronald E. Greigg; Edwin E. Greigg

[57] ABSTRACT

An electric motor for moving or adjusting parts of vehicles such as windshield wipers and sunroofs have switching devices for shutting of the electric motor in at least one predetermined position of the movable part, for example also for shutting off the electric motors when the parts are disposed in their end positions. For this purpose, the switching devices have at least one permanent magnet that is for the actuation of switching contacts and, for example, is disposed on a switching gear, and have at least one sensor that is sensitive to magnetic fields. Different switching gears are stored for different sizes of parts to be moved. The invention sets forth a switching gear as an annular disk made of a magnetizable material, wherein the material is preferably comprised of a permanent magnet powder and a thermoplastic bonding. Such an annular disk is magnetized either in the immediate vicinity of an associated drive device or when installed in this drive device. After at least one associated sensor is installed and the drive device is closed, it is ready for installation in a vehicle. Particularly when the magnetization of the annular disk takes place when it is already installed, no adjustment of the drive device is necessary before installation into a vehicle, which permits a drive device of this kind to be produced inexpensively.

13 Claims, 3 Drawing Sheets

DRIVE DEVICE FOR A MOVABLE PART THAT CAN BE DISPLACED BETWEEN END POSITIONS IN A VEHICLE AND METHOD FOR THE PRODUCTION THEREOF

PRIOR ART

The invention is based on a drive device for a part of a vehicle that can move between end positions and process for manfacturing it.

The document DE 10 24 373 C3 has already disclosed a drive device for a part that can move between end positions, such as a sunroof of a vehicle. This drive device has an electric motor, a step-down gear disposed after the electric motor, a cable roller that is coupled to the step-down gear and is for moving a cable leading to the sunroof. The device includes switching device that is drive connected to the cable drum by means of a gear pair, and a worm shaft, a worm gear that meshes with it, which has a switching finger and in this way, constitutes a switching gear, and has a first contact and a second contact that can be actuated by the switching finger. The switch contacts that can be actuated by the switching finger are used to shut off the electric motor when the sunroof reaches its structurally determined end positions. In this connection, the two gears, the worm, and the worm gear are embodied so that a movement of the sunroof between the structurally determined end positions essentially results in one third of a rotation of the worm gear. One of the end switches is disposed mounted in a fixed fashion in the switching device, whereas the other end position switch can be adjusted in order to adapt to the movement path of the sunroof. In this way, the drive device can be adjusted after its manufacture and can be installed in a vehicle in the adjusted state.

The U.S. Pat. No. 4,468,063 has disclosed another drive device for a sunroof. This includes an electric motor, a worm gear pair, a safety coupling on the worm gear pair, a gear shaft, and a first gear device can be driven by the gear shaft in order to drive a pinion that is engaged by drive wires of the sunroof, and a second gear device for driving a switch device. The second gear device is embodied here as a so-called cam toothed gear pair and supports a switching gear with cams. The first gear device and the second gear device are embodied in such a way that when the sunroof moves between its two end positions, the switching gear executes less than one rotation. The switching gear has two cams spaced axially apart, each of which is associated with a micro-switch. The Patent Disclosure discloses the fact that the drive device can be pre-assembled and exactly adjusted before being installed in a vehicle.

The Patent Disclosure EP 0 469 286 B1 has disclosed another drive device whose switching gear can have, for example, two cams and two switches associated with them. Alternatively, the Patent Disclosure also discloses the fact that in lieu of cams, permanent magnets can be fastened to the switching gear and that these permanent magnets are then associated with sensors that are sensitive to magnetic fields, such as Hall sensors.

There are other drive devices with electric motors, worm gear pairs, and control devices for moving windshield wipers between two end positions. Switching gears for actuating contacts and also cranks that engage wiper arms via connecting rods are then rigidly connected to the shafts of worm gears. By means of the U.S. Pat. No. 4,866,357 in a drive device for a windshield wiper, it is known, instead of mechanically actuated contacts, to use optical sensors that function without contact for the purpose of switching an electric motor alternatingly in two rotation directions depending on the selected size of a wiping field and to vary the wiping speed between the switching events according to a pre-selected time plan. Depending on a respective pivoting angle of a wiper arm, the optical sensors receive light signals that are controlled by a code disk. A code disk of this kind is equipped in this instance with a Gray code, so it needs a number of code tracks and requires a relatively complex evaluation circuit which is connected to the optical sensors, as well as a regulating circuit that compares evaluation results with set point values that can be read from a program memory, and controls the speed of the electric motor as a function of the comparison result. Another drive device disclosed by Patent Disclosure EP 0 531 793 A1, with a so-called ultrasound motor that can be driven in two rotation directions, likewise has a code disk that can be rotated synchronously with a wiper arm, which has light and dark markings. In this connection, the light and dark markings are disposed so that they indicate pivot positions of the windshield wiper arm directly in connection with an optical sensor.

It is clear that no matter whether their switching gears are turned synchronously with output shafts of drive devices or are mechanically driven by these output shafts indirectly by way of step-down gears with fixed step-down ratios, such control devices must be mechanically adapted from case to case for each path or angle predetermined by a vehicle type, between end positions of the movable parts and if need be, at least one other intermediary position. As a result, it can be necessary to store different control cams or different code disks for different vehicle types or to adapt the alignment of sensors by means of a costly adjustment.

ADVANTAGES OF THE INVENTION

The drive device according to the invention, has an advantage that the switching gear can be stored as a neutral component made of magnetizable material and only shortly before installation in the respective individual drive device or after installation in this drive device, can be finished by means of magnetization with a magnetizing pattern that corresponds to the relevant intended use. The switching gears have at least one north-south pole sequence on one or more concentric annular zones, depending on the intended use. Since associated sensors that are sensitive to magnetic fields, such as Hall sensors, can easily be attached to a securing device such as a printed circuit board according to a predetermined pattern and thereby with a large degree of reproducibility, a time-consuming adjustment of the control devices is avoided. It is sufficient, for example, if each switching gear is tested as to the exact magnetization of north and south poles before a cover is mounted. The invention clearly reduces storage costs and accelerates the completion of drive devices.

The process achieves an advantage that the magnetization can be carried out, for example, on an assembly line for such drive devices so that before starting up a magnetizing device that is necessary for this, attention only has to be paid to the insertion of the correct magnetizing coil or magnetizing tool. The magnetization on the assembly line thus prevents confusion and simplifies storage.

The process has an advantage that the annular disk can be fastened to a worm gear before this worm gear is installed in the drive device.

Advantageous embodiments and improvements of the subject of the application are possible by means of the features disclosed herein.

The device has an advantage that the control device of the drive device is suited for shutting off the electric motor, for example in two end positions and/or in at least one additional intermediary position.

The drive device has an advantage that the switching gear is coupled to the drive device in a rotationally secured manner and for example in the event of a disassembly, it is possible to reproduce the original alignment. As a result, the features include a correct-side insertion of the switching gear into the drive device.

The process has an advantage that a single exact rotational alignment of the magnetizing tool or the magnetizing coil obviates the need for a subsequent alignment of the switching disk before the final completion of the drive device. In this respect, an unmagnetized switching disk could be inserted into the drive device in an arbitrary fashion and fixed against relative rotation, for example by means of an adhesive.

BRIEF DESCRIPTION OF THE DRAWINGS

According to the invention.

DESCRIPTION OF THE EXEMPLARY EMBODIMENT

In the exemplary embodiment, the drive device 2 according to the invention is embodied as a drive device for a windshield wiper, which wiper is driven by means of the drive device 2 rotating a partially depicted crank 3 of a crank mechanism, not shown, which leads to a wiper arm.

Figure 3:
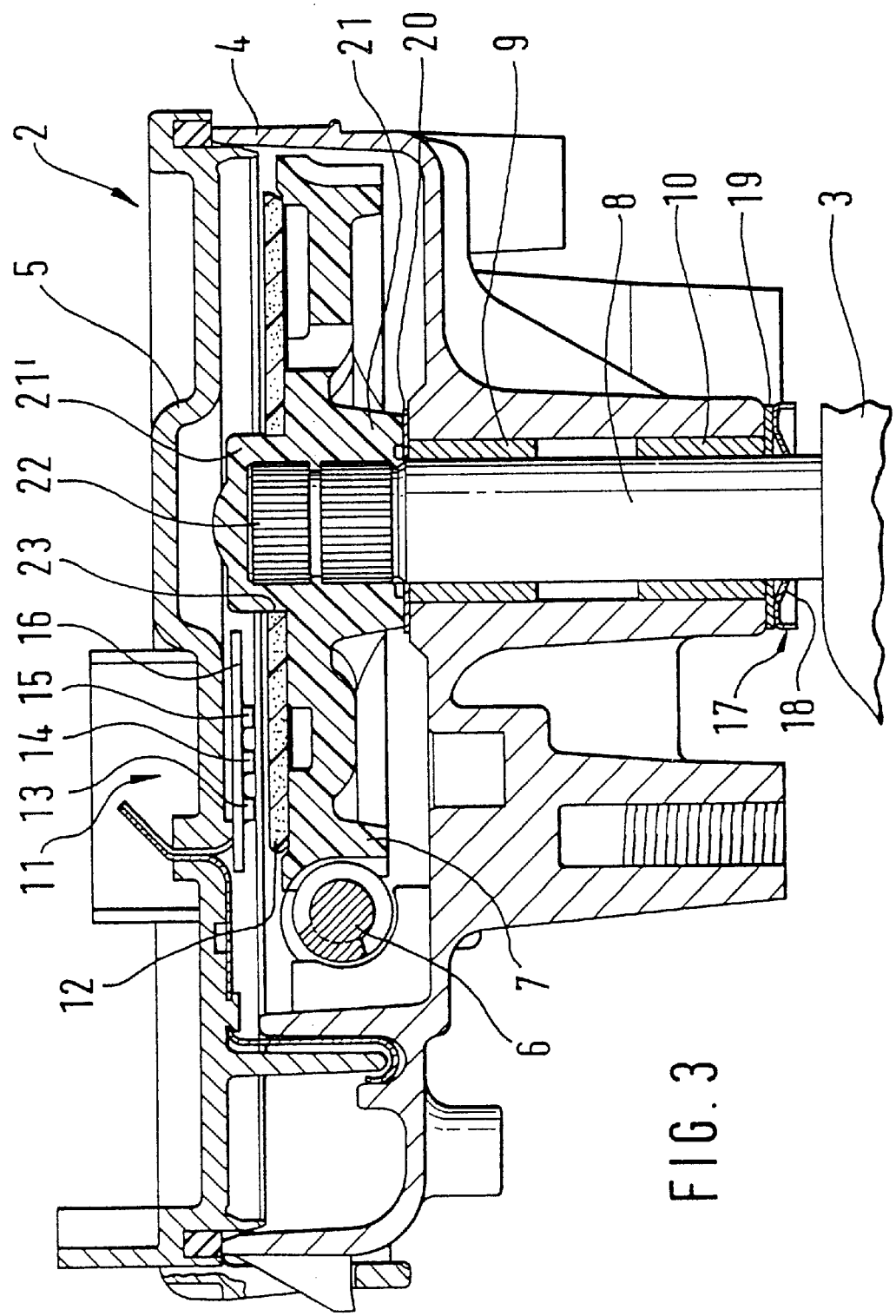
FIG. 3 shows the drive device according to the invention in an assembled state.

The drive device 2 has a housing 4 and according to FIG. 3, has a housing cover 5, an electric motor, not shown, for driving a worm shaft 6, a worm gear 7 that meshes with the worm shaft 6, a worm gear shaft 8 that is connected to the worm gear 7 in a rotationally fixed manner, bearing bushes 9 and 10 that are disposed in the housing 4 and are for the worm gear shaft 8, and a control device 11 which in the example has a switching gear 12 connected to the worm gear 7 in a rotationally fixed manner and, on the end face of the switching gear 12 and thereby remote from the worm gear 7, has three sensors 13, 14, 15 here that are sensitive to magnetic flux and are disposed on a sensor bridge 16.

The sensor bridge 16 is embodied, for example, as a printed circuit board that can be fastened to the housing cover 5. The sensors 13, 14, 15 in this instance have soldering lugs, not shown, by means of which the sensors 13 to 15 can be soldered onto the sensor bridge 16. The sensors 13 to 15 are embodied, for example, as Hall sensors and have a minimum distance from the switching disk 12. In order for this minimum distance to be maintained, a resilient axial securing ring 17 is disposed around the worm gear shaft 6 outside the housing 4. The axial securing ring 17 has resilient claws 18, which prevent the worm gear shaft 8 from drifting out of the axial securing ring 17 and thus prevent the worm gear 7 from approaching the sensors 13 to 15. In this instance, a stop disk 19 is installed between the axial securing ring 17 and the housing 4, which is comprised for example of a spring steel plate and has a wear reducing action so that a structurally desired distance between the worm gear 7 or the switching disk 12 and the sensors 13 to 15 is maintained to a sufficiently reliable degree. One such wear-reducing measure is also carried out through the insertion of a second stop disk 20 between a hub 21 of the worm gear 7 and the housing 4. The worm gear 7 and its hub 21 are injection molded out of thermoplastic plastic in this instance, by means of which a rotationally fixed connection to the worm gear shaft 8 can be produced by disposing a knurling 22 or an alternative diagonal knurling which the thermoplastic plastic penetrates in order to form a positive fit connection. To this extent, the mechanical components of the drive device 2 have been sufficiently described for one skilled in the relevant art.

Figure 1:
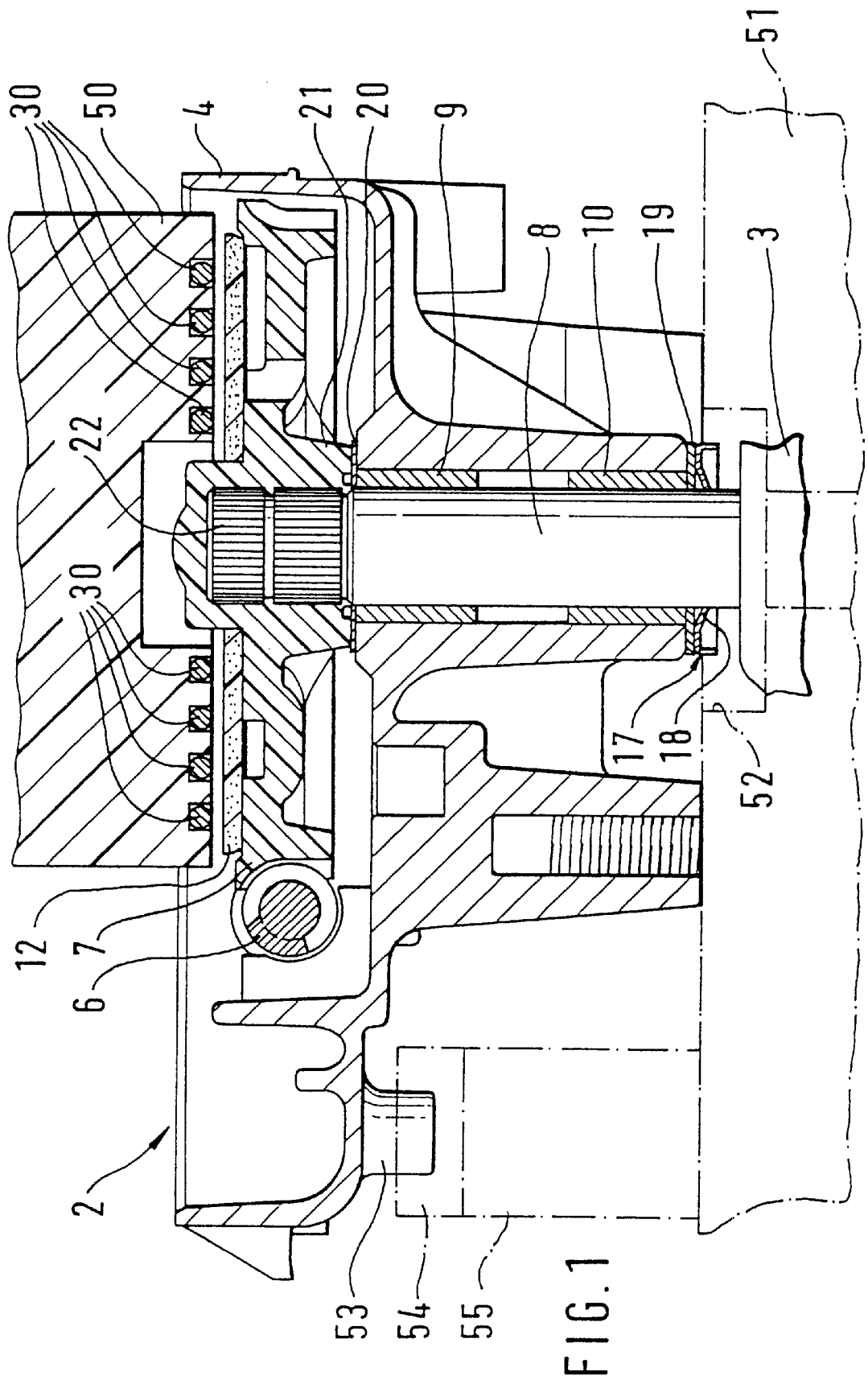
FIG. 1 shows a section through a partially completed drive device.
Figure 2:
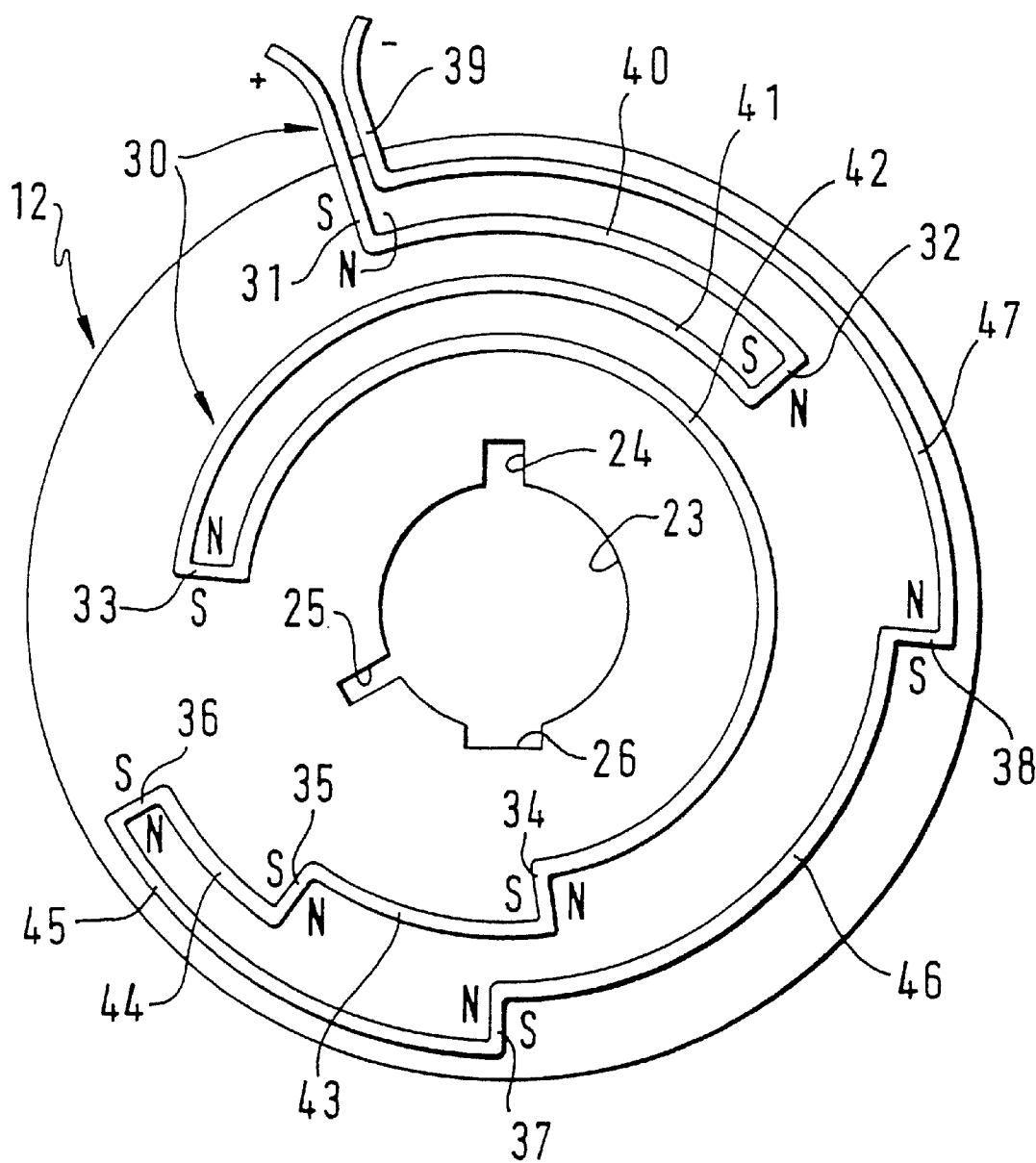
FIG. 2 shows a component part of the drive device according to the invention.

In FIGS. 1 and 3, the switching gear 12 is shown in a longitudinal section, wherein it is clear that a part 21' of the hub 21 is used as a centering pin, which protrudes into an opening 23 of the switching gear 12. FIG. 2 shows a top view of the switching gear 12 with its opening 23. For example, the circumference of the opening 23 is interrupted by three grooves 24, 25, and 26 that are different sizes. In a manner that is not shown, the part 21' can have projections that are adapted to the cross sections of the grooves 24, 25, and 26 so that these projections, together with the grooves 24, 25, and 26, constitute a multi-wedge connection which, when the switching disk 12 slides over the part 21', forces an alignment of the switching disk 12 in relation to the worm gear 7 and therefore later in relation to the crank 3, which alignment is on the correct side and has the correct rotational angle, in that the switching gear 12 cannot be slid over the part 21' in another alignment. The three grooves 24, 25, and 26 thus produce an encoding, as is known in principle, for example, in electrical plug connectors, in order to prevent incorrect connections and short circuits.

As can be seen from FIGS. 1 and 3, which show a radial section through the switching gear 12, the switching gear is embodied after the fashion of an annular disk, i.e. as essentially thin. This annular disk is manufactured, for example, out of permanent magnet powder and a thermoplastic bonding. In order for this annular disk 12 to be able to fulfill its intended task of signal generation in at least one of the sensors 13 to 15, it must be magnetized, wherein the magnetization takes place as a function of the adjustment path predetermined by a vehicle type. In each vehicle type or even each vehicle body type, therefore, the magnetization takes place in accordance with an adapted pattern. An example for such a pattern is shown in FIG. 2 through the disposition of a magnetizing coil 30, i.e. of a magnetizing tool, over the outline of the annular disk 12. Starting from a plus connection, the magnetizing coil 30 has a succession of radial wire sections 31 to 39 and between them, concentric, i.e. arc-shaped, wire sections 40 to 47. When magnetizing current is conducted through the magnetizing coil 30, then this magnetizing current flows radially inward in the radial wire section 31, i.e. in the direction of the center axis of the annular disk 12. According to the "right-hand screw rule", this produces the pole disposition depicted with N and S at 31 and produces the pole dispositions respectively indicated at 32, 33, 34, 35, 36, 37, and 38. A coil holder 50 of this type is depicted in schematic form in FIG. 1.

Based on FIG. 2, there is the clear possibility of magnetizing the switching gear 12 according to a predetermined pattern, without the switching gear 12 in the course of this being unified with the drive device 2. This possibility is utilized, for example, when an unmagnetized blank of such a switching gear is taken out of a storage space at the assembly line and is magnetized on the way to an assembly station of this assembly line. For this instance, the encoding produced through the disposition of grooves 24, 25, and 26 presents the danger that the switching gear 12 can be lowered onto the worm gear 7 along the part 21' only in the pre-planned alignment. It can then be affixed there, for example by means of adhesive.

The alternative to this is shown in FIG. 1 in conjunction with the magnetizing coil 30 that is oriented above the switching disk 12 by means of a coil holder 50. So that a pre-settable rotational alignment of the magnetizing pattern is achieved in relation to the switching gear 12 and thereby also in relation to the drive device 2, the housing 4 of the drive device 2 is inserted into a receiving device 51. For receiving a section of the worm gear shaft 8 that protrudes from the drive device 2, the receiving device 51 has a receiving bore 52 and for the correct rotational alignment around the receiving bore 52, the housing 4 has an aligning pin 53, which sticks into an aligning groove 54 that is disposed above and thereby on the end face of a column 55 belonging to the receiving device 51.

By using this receiving device 51 and the coil holder 50 that is suitably aligned in relation to it, and thereby also the coil 30, the magnetization is produced with a simultaneous correct alignment of the magnetizing pattern so that at the end of the magnetization, the drive device 2 is completely adjusted in relation to the switching gear 12. If the housing cover 5 shown in FIG. 3, with the sensor bridge 16 attached to it, is then placed on the housing 4, then the drive device 2 is completely assembled. Because it presents no technical difficulty to fasten the sensor bridge 16 to the housing cover 5 in a predetermined manner, then after the fastening of the housing cover 5, the drive device 2 is therefore finished and can then be supplied to a vehicle for the purpose of being installed.

As already mentioned, the invention is described in connection with a drive device 2 that is designated for a windshield wiper and therefore is relatively simple in design. The invention, however, can also be used in such a drive device that belongs to the genre of sunroof drive devices. This genre has been discussed extensively in the introduction to the specification so that it is not necessary for there to be an additional explanation in conjunction with a drawing. In the event that the invention is used in a sunroof drive device, it does not matter how linkage elements that transmit driving torque are embodied. It also does not matter which type of linkage is used to rotate the switching gear 12 depending on the length of a path that is traveled by a sunroof.

The use of the invention, however, is not limited to driving windshield wipers or sunroofs. On the contrary, the invention can also be used in power windows, ventilation flaps, sliding doors, vehicle seats, and steering wheel apparatuses.

The foregoing relates to preferred exemplary embodiments of the invention, it being understood that other variants and embodiments thereof are possible within the spirit and scope of the invention, the latter being defined by the appended claims.

What is claimed is:

1. A drive device for a part of a vehicle that can be moved between end positions, comprising an electric motor, a shaft that conveys a torque from the drive device, a switching device used to control and shut off the electric motor for at least one predetermined position of the movable part, said drive device has a switching gear with at least one permanent magnet and at least one sensor that is sensitive to a magnetic field, wherein the switching gear is coupled at least indirectly to the shaft so that when the part of the vehicle moves between two end positions, the switching gear is rotated by a maximum of 360°, the switching gear is embodied after the fashion of an annular disk (12) and comprises at least in part a magnetizable material, that at least one sensor (13, 14, 15) which is sensitive to magnetic flux is disposed on an end face of the annular disk (12), wherein at least one annular zone is magnetized in at least one region, and the annular disk (12) in this region has different magnetic poles (N and S or S and N) in succession in the rotation direction.

2. The drive device according to claim 1, in which radially offset from the drive device, the annular disk (12) has at least one other magnetized annular zone and has at least one other magnetic flux-sensitive sensor (14, 15) associated with this magnetized annular zone.

3. The drive device according to claim 2, in which the annular disk (12) has a number of different grooves (24, 25, 26) leading from a central opening (23), which are a component of an encoding that is used for an installation of the annular disk (12) into the drive device (2) in a correct position.

4. A process for manufacturing a drive device with an annular disk made of magnetizable material according to claim 2, which comprises magnetizing the annular disk (12) according to a predetermined pattern immediately before being installed into the drive device (2).

5. The process according to claim 4, in which the predetermined pattern is magnetized onto the annular disk (12) rotationally aligned in a predetermined fashion.

6. A process for manufacturing a drive device with an annular disk made of magnetizable material according to claim 2, which comprises installing the annular disk (12) into the drive device (2) in an unmagnetized state and fastened there, and that after this, magnetizing the annular disk (12) according to a predetermined pattern by means of a magnetizing device (30, 50).

7. The drive device according to claim 1, in which the annular disk (12) has a number of different grooves (24, 25, 26) leading from a central opening (23), which are a component of an encoding that is used for an installation of the annular disk (12) into the drive device (2) in a correct position.

8. A process for manufacturing a drive device with an annular disk made of magnetizable material according to claim 7, which comprises magnetizing the annular disk (12) according to a predetermined pattern immediately before being installed into the drive device (2).

9. The process according to claim 8, in which the predetermined pattern is magnetized onto the annular disk (12) rotationally aligned in a predetermined fashion.

10. A process for manufacturing a drive device with an annular disk made of magnetizable material according to claim 7, which comprises installing the annular disk (12) into the drive device (2) in an unmagnetized state and fastened there, and that after this, magnetizing the annular disk (12) according to a predetermined pattern by means of a magnetizing device (30, 50).

11. A process for manufacturing a drive device with an annular disk made of magnetizable material according to claim 1, which comprises magnetizing the annular disk (12) according to a predetermined pattern immediately before being installed into the drive device (2).

12. The process according to claim 11, in which the predetermined pattern is magnetized onto the annular disk (12) rotationally aligned in a predetermined fashion.

13. A process for manufacturing a drive device with an annular disk made of magnetizable material according to claim 1, which comprises installing the annular disk (12) into the drive device (2) in an unmagnetized state and fastened there, and that after this, magnetizing the annular disk (12) according to a predetermined pattern by means of a magnetizing device (30, 50).

* * * * *